(12) United States Patent
Byeon et al.

(10) Patent No.: US 11,116,347 B2
(45) Date of Patent: Sep. 14, 2021

(54) COMBINED VEGETABLE AND FRUIT PEELER

(71) Applicant: Dart Industries Inc., Orlando, FL (US)

(72) Inventors: Dongjin Byeon, Aalst (BE); Frederick M. N. De Pauw, Wetteren (BE); Nathalie De Beer, Herzele (BE)

(73) Assignee: Dart Industries Inc., Orlando, FL (US)

( * ) Notice: Subject to any disclaimer, the term of this patent is extended or adjusted under 35 U.S.C. 154(b) by 0 days.

(21) Appl. No.: 16/550,387

(22) Filed: Aug. 26, 2019

(65) Prior Publication Data

US 2021/0059459 A1      Mar. 4, 2021

(51) Int. Cl.
*A47J 17/04* (2006.01)

(52) U.S. Cl.
CPC .................... *A47J 17/04* (2013.01)

(58) Field of Classification Search
CPC ...................................................... A47J 17/04
See application file for complete search history.

(56) References Cited

U.S. PATENT DOCUMENTS

| 343,522 | A |   | 6/1886 | Peter |                       |
|---------|---|---|--------|----------|----------------------|
| 691,861 | A | * | 1/1902 | Hemstrom | B26B 27/00 30/280 |
| 1,472,462 | A | * | 10/1923 | De Port | A47J 17/04 30/123.7 |
| 2,095,640 | A | * | 10/1937 | Kinna | A47J 17/02 30/280 |
| 2,106,796 | A | * | 2/1938 | De Vault | A47J 17/02 30/280 |
| 2,546,032 | A | * | 3/1951 | Holmberg | A47J 17/04 30/123.5 |
| 2,814,874 | A | * | 12/1957 | Rosen | A47J 17/02 30/278 |
| 2,986,813 | A | * | 6/1961 | De Vault | A47J 17/02 30/280 |
| 3,237,299 | A | * | 3/1966 | Gibbs | A47J 17/04 30/123.7 |
| 3,406,450 | A | * | 10/1968 | Grotz | A47J 17/02 30/279.6 |
| 4,010,541 | A | * | 3/1977 | Papineau | A47J 17/04 30/123.7 |
| 4,083,107 | A | * | 4/1978 | Kuka | A47J 17/04 30/123.7 |

(Continued)

FOREIGN PATENT DOCUMENTS

| DE | 20 2004 017095 | 5/2005 |
| DE | 20 2004 012171 | 12/2005 |

(Continued)

OTHER PUBLICATIONS

Tupperware Citrus Peeler; 1970.

*Primary Examiner* — Ghassem Alie
*Assistant Examiner* — Fernando A Ayala
(74) *Attorney, Agent, or Firm* — Taylor J. Ross (57) ABSTRACT

A combined vegetable peeler and fruit peeler includes a handle and at least one leg extending from the handle. A slotted blade is mounted to the handle for peeling vegetables. The leg includes a citrus slicer having a cutting edge for slicing the rind of fruit. The leg may further include a peeling blade in the form of a protrusion having reduced thickness, with the peeling blade having utility in peeling the rind from fruit.

6 Claims, 7 Drawing Sheets

(56) References Cited

U.S. PATENT DOCUMENTS

| | | | | |
|---|---|---|---|---|
| 4,630,367 A | * | 12/1986 | Pressman | B26B 3/00 |
| | | | | 30/279.6 |
| D354,888 S | | 1/1995 | Cousins | |
| D407,277 S | | 3/1999 | Cousins | |
| 6,619,194 B1 | * | 9/2003 | Kuan | A47J 17/02 |
| | | | | 30/123.5 |
| D611,780 S | * | 3/2010 | Laib | D7/695 |
| 2004/0117991 A1 | * | 6/2004 | Haberstroh | A47J 17/02 |
| | | | | 30/279.6 |
| 2014/0075759 A1 | * | 3/2014 | Sampaio | A47J 17/02 |
| | | | | 30/123.6 |

FOREIGN PATENT DOCUMENTS

| | | |
|---|---|---|
| DE | 10 2006 021085 | 8/2007 |
| DE | 20 2008 003511 | 5/2008 |
| GB | 505296 | 5/1939 |

* cited by examiner

COMBINED VEGETABLE AND FRUIT PEELER

CROSS REFERENCE TO RELATED APPLICATIONS

This application is related to co-pending Ser. No. 29/703,189, filed Aug. 26, 2019, which is incorporated by reference herein.

STATEMENT REGARDING FEDERALLY SPONSORED RESEARCH

Not applicable.

BACKGROUND OF THE INVENTION

The present invention relates in general to manual peelers for vegetables and fruits.

It is well known to provide vegetable peelers having a slotted blade mounted for restricted pivoting to remove the skin or outer layer of vegetables. These are commonly formed as horizontal peelers or vertical peelers. It is also well known to provide a citrus peeler having a first section with a citrus slicer in the form of a protrusion having a cutting edge along its length, and a peeling blade in the form of a reduced thickness portion suitable for insertion under the rind for peeling. These have been separate implements, requiring separate purchase and separate effort to locate each one in the kitchen when needed.

SUMMARY OF THE INVENTION

An object of the present invention is to provide a combined vegetable and fruit peeler.

Another object of the present invention is to provide a combined vegetable and fruit peeler with a slotted blade for vegetables and a citrus slicer for fruits.

A further object of the present invention is to provide a combined vegetable and fruit peeler in which a portion of the peeler body forms a peeling blade.

These and other objects are achieved by a combined vegetable and fruit peeler.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
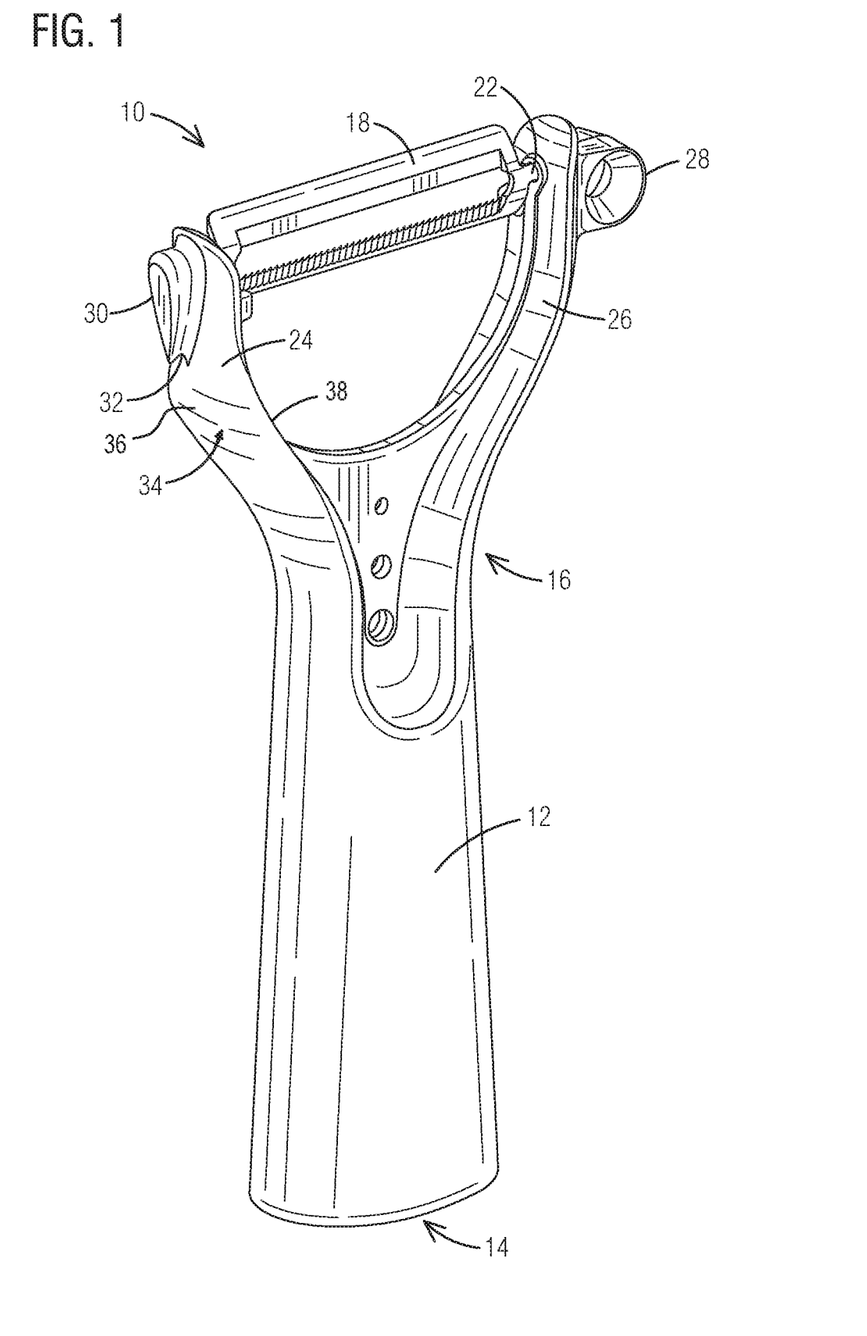
FIG. 1 is a top, front, right perspective view of a first embodiment of the combined vegetable and fruit peeler according to the present invention in the operative configuration.
Figure 2:
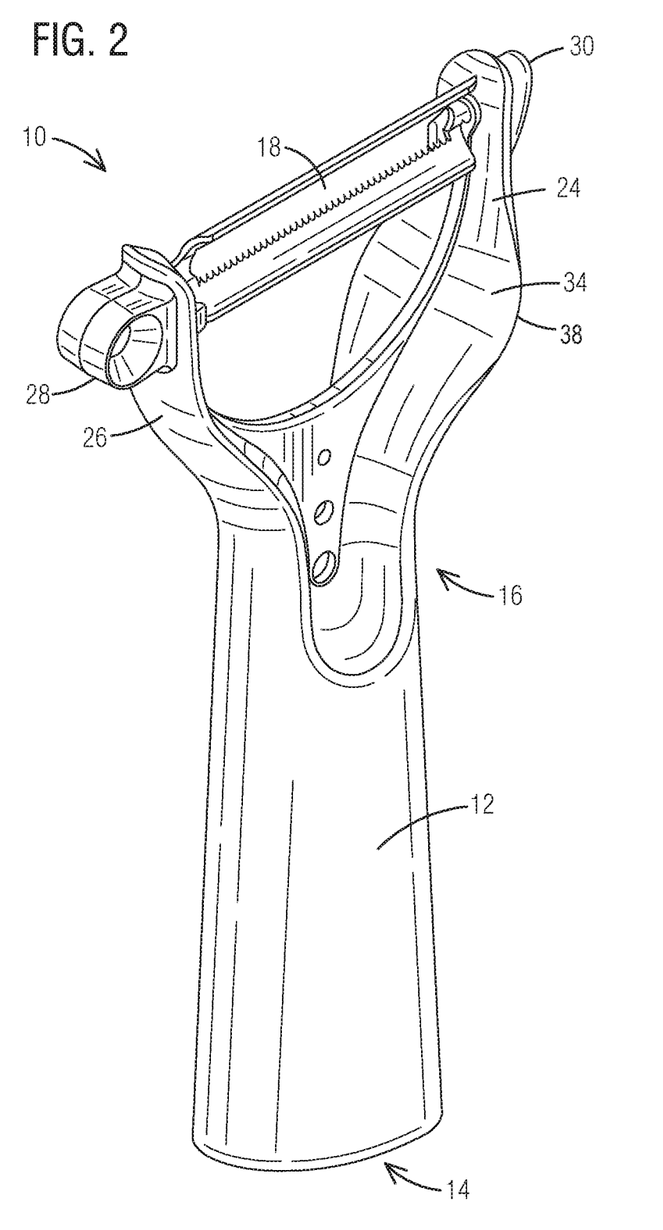
FIG. 2 is top, rear, left perspective view of the peeler of FIG. 1.
Figure 3:
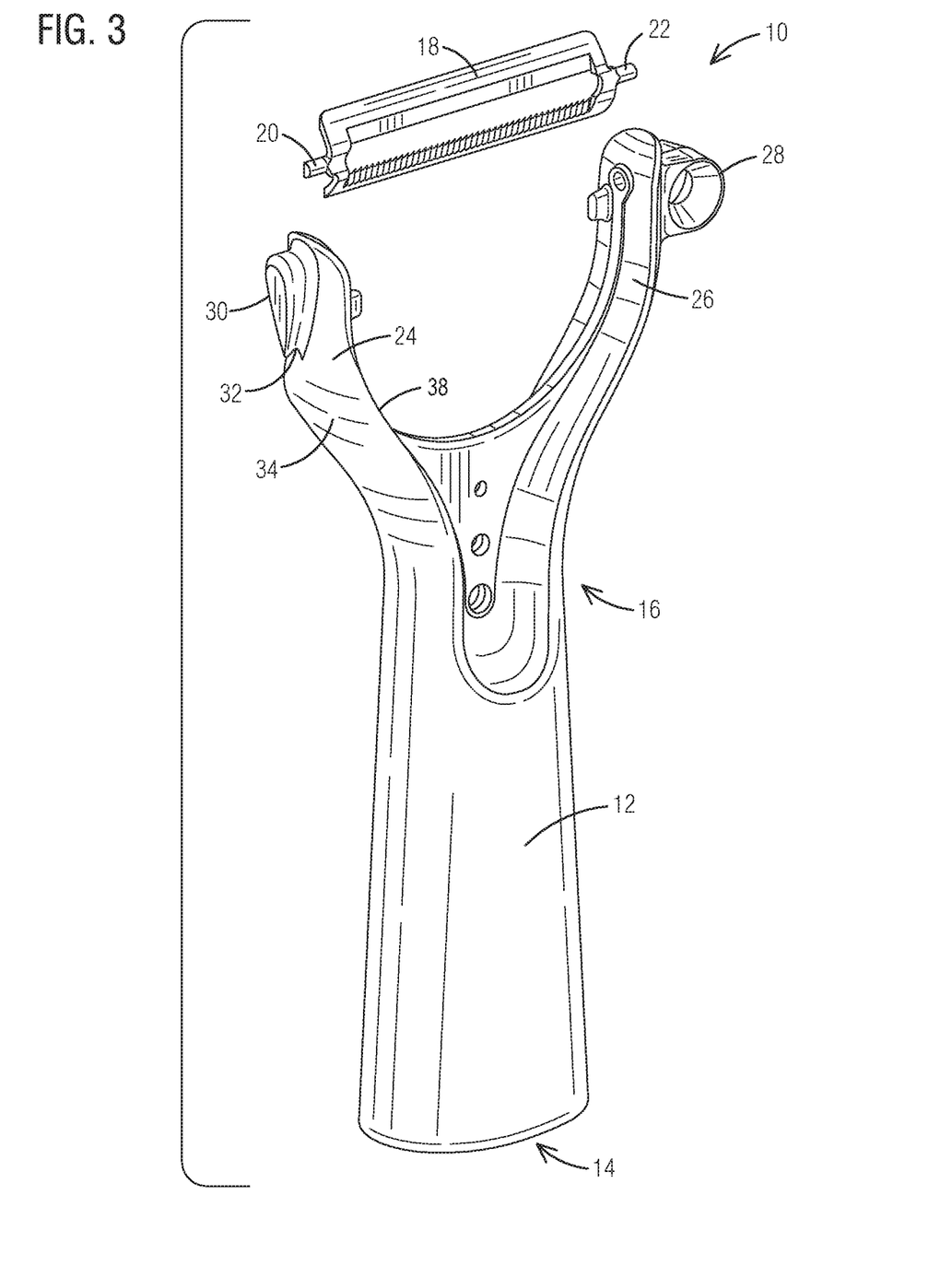
FIG. 3 is an exploded top perspective view thereof.
Figure 4:
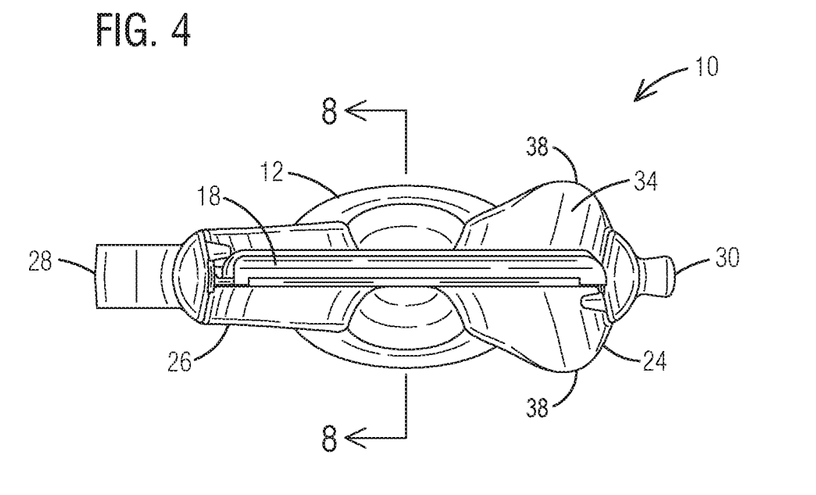
FIG. 4 is a top view.
Figure 5:
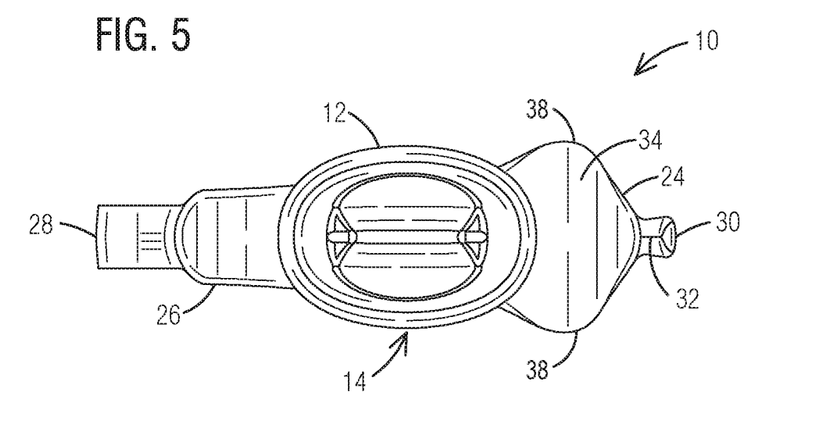
FIG. 5 is a bottom view.
Figures 6, 7:
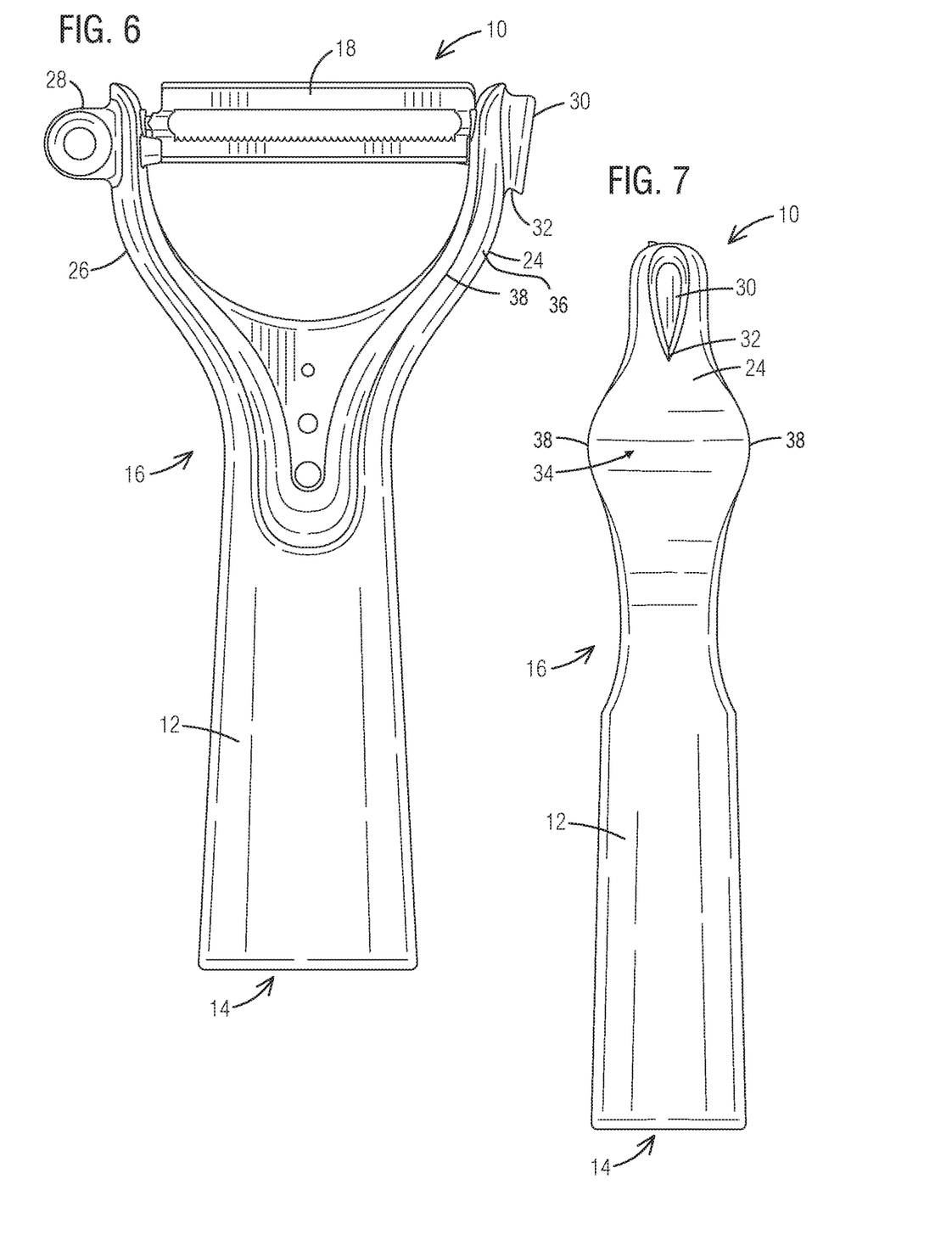
FIG. 6 is a rear view.
FIG. 7 is a right side view.
Figure 8:
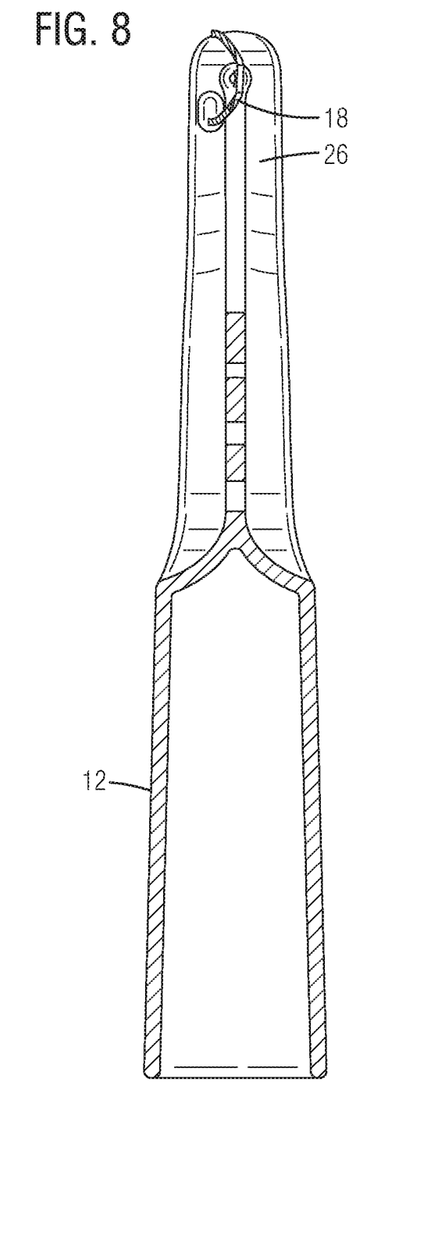
FIG. 8 is a detailed cross-sectional view along line 8-8 of FIG. 6.
Figure 9:
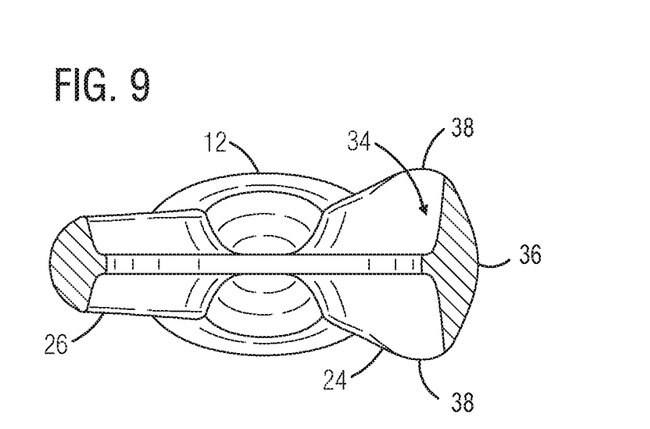
FIG. 9 is a detailed cross-sectional view along line 9-9 of FIG. 6.

With reference to FIG. 1, a combined vegetable and fruit peeler according to the present invention is generally designated by reference numeral 10. The peeler 10 generally includes a handle 12, sized and shaped to be manually grasped by a user. The handle 12 has a free end 14 and an implement end 16. A blade 18 is mounted to the implement end 16. As is known in the art, the blade 18 is elongated and typically a slotted blade. Further, the blade 18 has first and second ends 20 and 22, respectively. While not required, it is preferred that the blade 18 be mounted for partial pivoting about its longitudinal axis as is known in the art, to allow the blade 18 to conform to the irregular surfaces of a vegetable.

In the embodiment shown in FIGS. 1-9, first and second legs 24 and 26 extend from the implement end 16 in a general U-shaped configuration. Each of the legs 24 and 26 include appropriate apertures to receive and mating one of the first and second ends 20 and 22 of blade 18. In this embodiment, the blade extends transversely to the handle 12 and thus creates what is typically known as a horizontal peeler.

Figure 10:
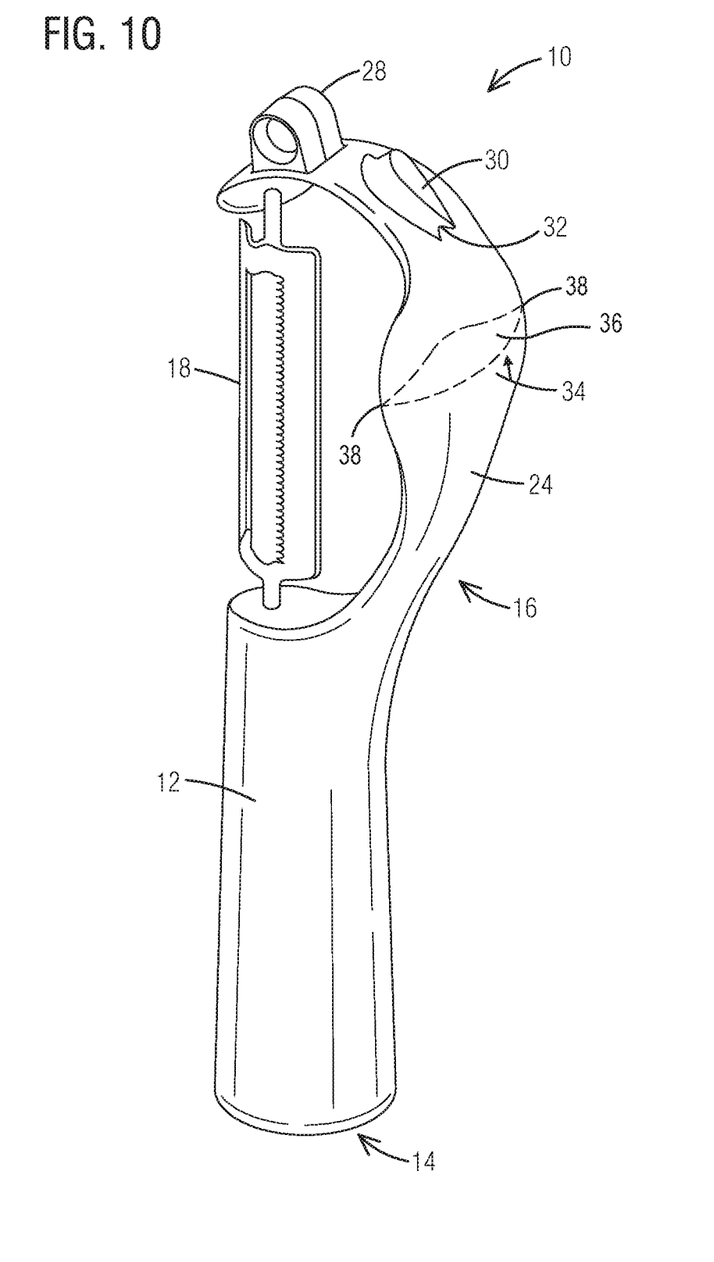
FIG. 10 is a top perspective view of a second embodiment of the combined vegetable and fruit peeler according to the present invention in the operative configuration.

In the embodiment shown in FIG. 10, only the first leg 24 is employed. Here, the first leg 24 extends in a general C-shaped configuration. Each end of the curved first leg 24 includes an aperture to receive the first and second ends 20 and 22 of the blade 18. In this embodiment, the blade extends parallel to the handle 12 and thus creates what is typically known as a vertical peeler. While not shown, other configurations known in the art are possible, such as use of first and second legs 24 and 26 of unequal lengths such that the blade 18 is mounted at an angle to the handle 12.

As is known in the art, the second leg 26 may mount a notching member 28. These typically take the form of an annular extension having relatively sharp front and back edges. The notching member 28 is well known for removing the eyes from potatoes or other vegetable imperfections.

The inventive feature of the present peeler 10 is the inclusion of citrus implements as well. In particular, the first leg 24 mounts a citrus slicer 30 in the form of an protrusion extending from the first leg 24 and having a tapered portion leading to a pointed end forming a relatively sharp edge 32 extending parallel to the longitudinal axis of the citrus slicer 30. In the preferred form, the citrus slicer 30 is formed as a monolithic extension of the first leg 24. As is known in the art, the sharp edge 32 is inserted into the peel of a citrus, such as an orange, and the citrus slicer 30 is then manually drawn along the periphery of the citrus to create a long continuous slice.

While the inclusion of the citrus slicer 30 expands the use of the peeler 10 from the usual vegetables-only to also include fruit, it is preferred that the peeler 10 provide more utility with regard to fruits. To achieve this, the first leg 24 is modified to form a peeling blade 34. As shown, this peeling blade 34 is comprised of an area of leg 24 which has a greater width than the remainder, so as to form a protrusion 36. This protrusion is preferably tapered on each side to blend smoothly into the remainder of leg 24, but this is not required. Further, the peeling blade 34 has a reduced thickness leading to a sharpened edge 38 along the protrusion 36. This is best illustrated in the cross-section of FIG. 9. In the embodiment shown, the peeling blade 34 is formed monolithically with the first leg 24, but if desired could be formed as a separate element mounted thereto. Further, in the embodiment shown the protrusion extends from both the front and rear faces, but could be present on only one or the other face. The peeling blade 34 may be manually inserted through the rind of the fruit, or preferably, inserted through the rind of the fruit as a cut previously formed by the citrus slicer 30. The peeling blade 34 may then be moved along the periphery to cut beneath the rind and thus help with removing the rind.

In the embodiment of FIGS. 1-9 using first and second legs 24 and 26, the second leg 26 mounts the notching member 28, while the first leg 24 mounts the citrus slicer 30 and peeling blade 34. In the embodiment of FIG. 10 only one of the legs is employed. As shown in FIG. 10 it is possible to mount all three of the notching member 28, citrus slicer 30, and peeling blade 34 all on this one leg 24. As shown these elements are mounted in the order shown and described, but different placement would be possible. Similarly, in FIGS. 1-9 all three elements could alternatively be mounted on a common one of the legs 24 or 26, or could be mounted in different combinations.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A combined vegetable and fruit peeler, comprising: a handle; at least one leg extending from said handle, said at least one leg having a central longitudinal axis; a slotted blade mounted to said at least one leg; a citrus slicer extending from said at least one leg as a first protrusion, said citrus slicer including a sharp edge extending outward from said at least one leg and tapering to a pointed end; and wherein said at least one leg flares radially outward from the central longitudinal axis in a direction relative to the pointed end of the citrus slicer that is to the right and/or the left of the pointed end to define a peeling blade as an area of said at least one leg, said area having a width; wherein said peeling blade forms a second protrusion that is convexly profiled in a direction away from the citrus slicer along the central longitudinal axis, and, in a cross-section transverse to the central longitudinal axis of said at least one leg, defines a generally crescent-shaped solid body portion of said at least one leg that has a convexly profiled exterior surface extending said width of said area and has a reduced thickness leading to a sharpened edge at a periphery of said at least one leg.

2. A combined vegetable and fruit peeler as in claim 1, wherein said at least one leg comprises first and second legs, and wherein said slotted blade includes first and second ends; said first end mounting to said first leg, and said second end mounting to said second leg.

3. A combined vegetable and fruit peeler as in claim 1, further including a notching member mounted to said at least one leg.

4. A combined vegetable and fruit peeler as in claim 1, wherein said at least one leg and said peeling blade are a monolithic body.

5. A combined vegetable and fruit peeler as in claim 4, wherein said peeling blade tapers smoothly into a remainder of said at least one leg.

6. A combined vegetable and fruit peeler as in claim 1, wherein said width of said area is greater than a width of a remainder of said at least one leg, and said peeling blade has reduced thickness leading to a first sharpened edge at a front periphery of said at least one leg and has a reduced width leading to a second sharpened edge at a rear periphery of said at least one leg.

* * * * *